United States Patent
Oh

(10) Patent No.: US 11,873,777 B2
(45) Date of Patent: Jan. 16, 2024

(54) START-UP METHOD AND APPARATUS FOR CAM ANGLE SENSOR ERROR OF MILD HYBRID SYSTEM

(71) Applicant: HYUNDAI KEFICO CORPORATION, Gyeonggi-do (KR)

(72) Inventor: Dong Uk Oh, Gyeonggi-do (KR)

(73) Assignee: Hyundai Kefico Corporation, Gyeonggi-do (KR)

( * ) Notice: Subject to any disclaimer, the term of this patent is extended or adjusted under 35 U.S.C. 154(b) by 0 days.

(21) Appl. No.: 17/706,099

(22) Filed: Mar. 28, 2022

(65) Prior Publication Data

US 2022/0307440 A1  Sep. 29, 2022

(30) Foreign Application Priority Data

Mar. 29, 2021 (KR) .................. 10-2021-0040735

(51) Int. Cl.
*F02D 41/22* (2006.01)
*F02N 11/04* (2006.01)
(Continued)

(52) U.S. Cl.
CPC ......... *F02D 41/222* (2013.01); *F02D 41/009* (2013.01); *F02D 41/062* (2013.01);
(Continued)

(58) Field of Classification Search
CPC .............. F01L 1/053; F01L 2001/0537; F01L 2800/11; F01L 2820/041; F02N 11/006; F02N 11/04; F02N 11/0848; F02N 11/0859; F02N 2200/022; F02N 2300/2002; F02D 2200/101; F02D 41/009; F02D 41/062;
(Continued)

(56) References Cited

U.S. PATENT DOCUMENTS

| 10,384,665 B1* | 8/2019 | Boyko ................. B60W 20/00 |
| 2002/0092499 A1* | 7/2002 | Kargilis ................ F02D 41/009 |
| | | 73/114.25 |

(Continued)

FOREIGN PATENT DOCUMENTS

| DE | 10 2017 129 128 A1 | 6/2018 |
| DE | 10 2020 121 821 A1 | 8/2021 |

(Continued)

*Primary Examiner* — John M Zaleskas
(74) *Attorney, Agent, or Firm* — Fox Rothschild LLP

(57) ABSTRACT

A start-up method of a mild hybrid system determines whether start-up is attempted through an MHSG in accordance with a request for start-up from a driver, compares an engine rpm at the end of cranking with a reference rpm in start-up using the MHSG, determines whether an engine rpm immediately after start-up follows an idle target rpm when the engine rpm at the end of cranking exceeds the reference rpm, checks whether there is an error in a cam angle sensor when poor following in which the engine rpm immediately after start-up does not follow the idle target rpm is generated, forcibly changes an engine state into cranking when the cam angle sensor has an error, and executes an existing backup crank logic that decreases a target rpm of the MHSG and finds out a fuel injection time while performing test injection using a signal from an crank angle sensor.

12 Claims, 2 Drawing Sheets

(51) Int. Cl.
  *F02D 41/00* (2006.01)
  *G01M 15/06* (2006.01)
  *F02N 11/08* (2006.01)
  *F02N 11/00* (2006.01)
  *F02D 41/06* (2006.01)

(52) U.S. Cl.
  CPC ............ *F02N 11/006* (2013.01); *F02N 11/04* (2013.01); *F02N 11/0848* (2013.01); *F02N 11/0859* (2013.01); *G01M 15/06* (2013.01); *F01L 2800/11* (2013.01); *F02D 2200/101* (2013.01); *F02N 2300/2002* (2013.01)

(58) Field of Classification Search
  CPC .... F02D 41/064; F02D 41/065; F02D 41/222; G01M 15/06
  See application file for complete search history.

(56) References Cited

U.S. PATENT DOCUMENTS

| | | | | |
|---|---|---|---|---|
| 2002/0179347 | A1* | 12/2002 | Tamai | F02N 11/08 180/65.25 |
| 2003/0163247 | A1* | 8/2003 | Kobayashi | F02D 41/222 701/114 |
| 2004/0000882 | A1* | 1/2004 | Wakitani | F02N 11/04 318/66 |
| 2006/0178803 | A1* | 8/2006 | Nakamura | F02D 41/222 701/105 |
| 2007/0028880 | A1* | 2/2007 | Yuya | F02N 11/08 123/179.3 |
| 2007/0246012 | A1* | 10/2007 | Ando | F02D 41/222 123/406.62 |
| 2008/0093863 | A1* | 4/2008 | Roh | F02N 11/006 290/38 R |
| 2009/0140521 | A1* | 6/2009 | Bryan | B60W 10/06 290/31 |
| 2011/0307137 | A1* | 12/2011 | Bryan | B60W 30/194 180/65.265 |
| 2012/0122630 | A1* | 5/2012 | Huber | B60W 10/06 903/902 |
| 2012/0179312 | A1* | 7/2012 | Schwenke | G06F 17/00 180/65.265 |
| 2013/0261865 | A1* | 10/2013 | Toki | B60W 10/06 180/65.265 |
| 2015/0083079 | A1* | 3/2015 | Li | F02N 11/08 123/350 |
| 2016/0214601 | A1* | 7/2016 | Ito | B60W 10/08 |
| 2017/0120896 | A1* | 5/2017 | Thompson | B60K 6/48 |
| 2018/0100461 | A1* | 4/2018 | Eom | F02N 11/106 |
| 2018/0134138 | A1* | 5/2018 | Kim | B60K 6/26 |
| 2018/0162368 | A1* | 6/2018 | Kim | B60K 6/547 |
| 2019/0078525 | A1* | 3/2019 | Kwon | F02D 41/062 |
| 2019/0184972 | A1* | 6/2019 | Kim | B60W 10/06 |
| 2021/0039627 | A1* | 2/2021 | Kim | B60W 10/06 |
| 2021/0253084 | A1* | 8/2021 | Kwon | B60W 20/40 |
| 2021/0300316 | A1* | 9/2021 | Doering | B60W 30/192 |
| 2021/0339732 | A1* | 11/2021 | Lee | F02N 11/0848 |
| 2021/0348586 | A1* | 11/2021 | Kucukarslan | F02N 11/087 |
| 2022/0032901 | A1* | 2/2022 | Park | B60W 20/15 |
| 2022/0097677 | A1* | 3/2022 | Meyer | B60W 20/40 |
| 2022/0213856 | A1* | 7/2022 | Baxendale | F02N 15/022 |

FOREIGN PATENT DOCUMENTS

| | | |
|---|---|---|
| DE | 10 2020 131 709 A1 | 2/2022 |
| JP | 11-117840 | 4/1999 |
| KR | 2005-0042670 A | 5/2005 |
| KR | 10-2011-0047188 A | 5/2011 |
| KR | 2011-0055427 A | 5/2011 |
| KR | 10-2013-0012765 A | 2/2013 |
| KR | 20150055153 A * | 5/2015 |
| KR | 10-1776766 B1 | 9/2017 |
| KR | 10-2019-0028086 A | 3/2019 |
| KR | 2019-0028086 A | 3/2019 |

* cited by examiner

START-UP METHOD AND APPARATUS FOR CAM ANGLE SENSOR ERROR OF MILD HYBRID SYSTEM

CROSS REFERENCE TO RELATED APPLICATION

The present application claims priority to Korean Patent Application No. 10-2021-0040735, filed Mar. 29, 2021, the entire contents of which is incorporated herein for all purposes by this reference.

BACKGROUND

1. Field

In one aspect, the present disclosure relates to a start-up method and apparatus for a cam angle sensor error of a mild hybrid system and, more particularly, to a start-up method and apparatus for a cam angle sensor error of a mild hybrid system, the start-up method and apparatus designed to prepare for failure of start-up when a backup crank mode cannot normally correct a fuel injection time due to errors of two cam angle sensors in a 48V mild hybrid system that uses a Mild Hybrid Starter and Generator (MHSG).

2. Background

In general, in an internal combustion engine, an ECU determines an optimal fuel injection time suitable for the operation condition of each cylinder on the basis of a signal from a cam angle sensor and injects fuel into the cylinder at the fuel injection time. The injected fuel is uniformly fixed with intake air and is ignited by strong compression by a piston or ignited by an ignition plug in the cylinder, thereby being burned.

The ECU determines a fuel injection time in a cranking state on the basis of a signal from the cam angle sensor and performs control so that fuel can be injected at the determined fuel injection time when starting-up, thereby making a state in which the internal combustion engine can be driven by itself. For reference, a cam angle sensor is a sensor that detects a rotational position or a rotational angle of a camshaft, and one cam angle sensor is provided on each of camshafts at an intake side and an exhaust side.

As described above, a cam angle sensor has a very important function of determining the start-up ability, power, operation efficiency, etc. of an internal combustion engine. If an error is generated in a cam angle sensor, a fuel injection time cannot be accurately corrected, so engine stall may occur. In particular, when a fuel injection time is not correct in starting-up, the engine state cannot change into a run state (in which an engine is driven by itself over idle rpm), so start-up may fail.

A plan for preparing for start-up failure due to such a cam angle sensor error in the related art is a backup crank logic. A backup crank logic is programmed to perform test injection with reference to a signal from a crank angle sensor when two cam angle sensors both generate an error, and to determine that a fuel injection time has been corrected and to perform normal injection when the rpm increases during the test injection.

However, it is required to maintain the engine rpm at 200~250 rpm, which is the driving rpm of a 12V starter motor, in starting-up in order to normally operate the logic. That is, the logic performs test injection (injecting fuel while changing a fuel injection time in small increments) while maintaining the engine rpm around 200~250 rpm that is the driving rpm of a 12V starter motor, and corrects a fuel injection time while checking an rpm change during the test injection.

However, since, in a common mild hybrid system, a Mild Hybrid Starter and Generator (MHSG) drives an engine maximally up to 1200 rpm greatly exceeding the available rpm range (200~250 rpm) of the existing 12V starter motor, there is a problem that it is impossible to normally use such an existing backup crank logic when an error is generated in a cam angle sensor.

SUMMARY

In one aspect, a start-up method and apparatus is provided for a cam angle sensor error of a mild hybrid system, the start-up method and apparatus being able to normally use an existing crank logic or controller (a logic or controller that finds out a fuel injection time for each cylinder by performing test injection around 200~250 rpm) by forcibly decreasing the rpm of a Mild Hybrid Starter and Generator (MHSG) when it is impossible to accurately correct a fuel injection time due to a cam angle sensor error when a mild hybrid system starts up a vehicle with the MHSG.

In one aspect,
a start-up method for a cam angle sensor error of a mild hybrid system which is a method being able to normally use an existing backup crank logic when there is an error in a cam angle sensor while start-up is performed through a Mild Hybrid Starter and Generator (MHSG) of a mild hybrid system, includes:
  a step (a) of determining whether start-up is attempted through the MHSG in accordance with a request for start-up from a driver;
  a step (b) of comparing an engine rpm at the end of cranking with a preset reference rpm in start-up using the MHSG;
  a step (c) of determining whether an engine rpm immediately after start-up follows an idle target rpm when the engine rpm at the end of cranking exceeds the reference rpm;
  a step (d) of checking whether there is an error in a cam angle sensor when poor following in which the engine rpm immediately after start-up does not follow the idle target rpm is generated;
  a step (e) of forcibly changing an engine state into cranking when an error is found in the cam angle sensor;
  a step (f) of executing an existing backup crank logic that decreases a target rpm of the MHSG and finds out a fuel injection time while performing test injection using a signal from an crank angle sensor when the engine state is changed into cranking; and
  a step (g) of determining whether the engine state has entered a normal RUN state.

The reference rpm may be a minimum engine rpm at the normal end of cranking when a remaining battery capacity is sufficient and start-up is performed through the MHSG.

In the step (f), the target rpm of the MHSG may be decreased to an available rpm range of a 12V starter motor by decreasing output through duty control of the MHSG.

The start-up method according to an aspect of the present disclosure may further include a step (h) of determining that start-up has failed when the engine rpm at the end of cranking does not reach the reference rpm as the result of comparison in the step (b).

An algorithm that recognizes that start-up is impossible to the MHSG and attempts again start-up through a 12V starter motor when it is determined that start-up has failed in the step (h), and returns to the step (a) when it is determined that start-up has not failed may be configured.

A process may be ended when it is determined that the normal RUN state has been entered in the step (g), and the process may be changed to the step (h) when it is determined that the normal RUN state has not been entered in the step (g).

When the engine rpm is the idle target rpm or higher, it may be determined that the normal RUN state has been entered in the step (g).

In another aspect, an apparatus is provided for a cam angle sensor error of a mild hybrid system that includes:

- a Mild Hybrid Starter and Generator (MHSG) configured to perform start-up using power from a high-voltage battery or charge the high-voltage battery by generating power using output of an engine;
- a starter motor configured to start the engine for example using power from a low-voltage battery;
- a cam angle sensor configured to detect a rotational position or a rotational angle of a camshaft;
- a crank angle sensor configured to detect a rotational position or a rotational angle of a crankshaft; and
- a controller configured to control start of the engine on the basis of output from the cam angle sensor and the crank angle sensor,
- in which the controller determines whether an engine rpm immediately after start-up follows an idle target rpm when an engine rpm at the end of cranking exceeds a preset reference rpm in start-up using the MHSG, checks whether there is an error in the cam angle sensor when poor following in which the engine rpm immediately after start-up does not follow the idle target rpm is generated, forcibly changes an engine state into cranking when an error is found in the cam angle sensor, and executes an existing backup crank logic that decreases a target rpm of the MHSG and finds out a fuel injection time while performing test injection using a signal from an crank angle sensor.

The starter motor suitably may be a 12V or other suitable motor suitably configured to start the engine for example using power from a low-voltage battery such as a 12V battery.

The reference rpm may be an engine rpm at the normal end of cranking when a remaining battery capacity is sufficient and start-up is performed through the MHSG.

When the target rpm of the MHSG is decreased, the target rpm of the MHSG may be decreased to an available rpm range of the 12V starter motor by decreasing output through duty control of the MHSG.

The controller may determine that start-up has failed when the engine rpm at the end of cranking does not reach the reference rpm, and may reattempt start-up through the 12V starter motor when start-up has failed.

According to an embodiment of the present disclosure, it is possible to normally use an existing backup crank logic (a logic that finds out a fuel injection time by performing test injection around 200~250 rpm) even through an error is generated in a cam angle sensor when start-up is performed by an MHSG having large torque, whereby it is possible to clearly remove the problem of the related art that start-up is not achieved through an MHSG when an error is generated in a cam angle sensor.

Further provided are vehicles that comprise apparatus and/or methods as disclosed herein, including a passenger vehicle, truck or other vehicle.

As referred to herein in at least certain aspects, the term "mild hybrid" refers to a hybrid system that includes an energy storage system (e.g., a rechargeable energy storage system) that is not capable of providing sufficient energy/power to support operation of the transport climate control system at full capacity by itself.

Such a mild hybrid system may be distinct from a "full hybrid system" that refers to a hybrid system that includes an energy storage system (e.g., a rechargeable energy storage system) that may be capable of providing sufficient energy/power to support operation of the transport climate control system at full capacity by itself.

BRIEF DESCRIPTION OF THE DRAWINGS

The above and other objectives, features and other advantages of the present invention will be more clearly understood from the following detailed description when taken in conjunction with the accompanying drawings, in which.

DETAILED DESCRIPTION

Figure 1:
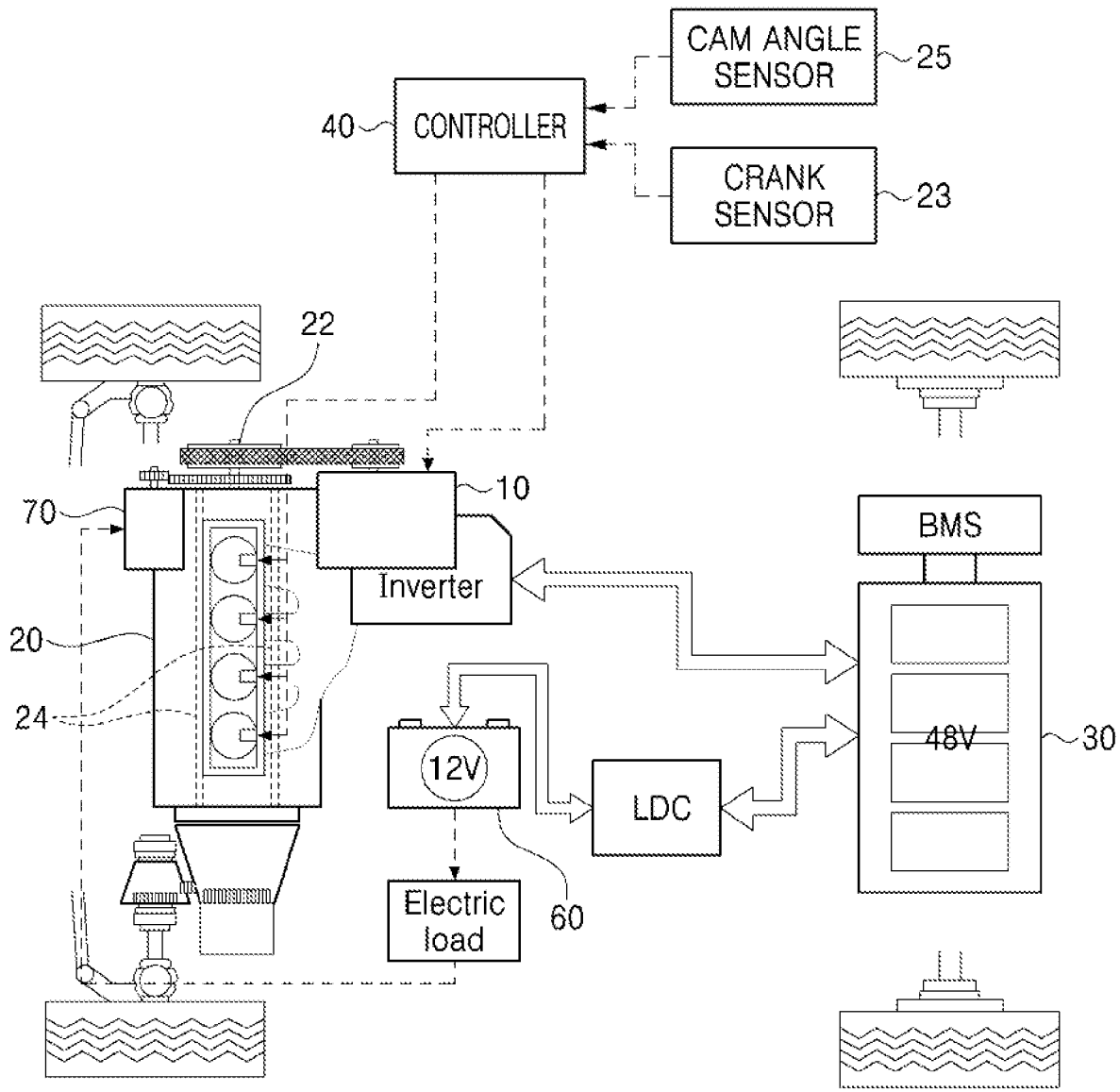
FIG. 1 is a schematic diagram showing the configuration of a start-up apparatus for a cam angle sensor error of a mild hybrid system according to an embodiment of the present disclosure.

Hereinafter, exemplary embodiments of the present disclosure are described in detail with reference to the drawings.

The terminology used herein is for the purpose of describing particular embodiments only and is not intended to limit the present disclosure. Singular forms are intended to include plural forms unless the context clearly indicates otherwise.

It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements.

Terms used in the specification, "first", "second", etc., may be used to describe various components, but the components are not to be construed as being limited to the terms. The terms are used only to distinguish one component from another component.

Terms "~er", "~unit", "~module", etc. used herein mean the units for processing at least one function or operation and may be implemented by hardware, software, or a combination of hardware and software.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example, both gasoline-powered and electric-powered vehicles.

In the following description referring to the accompanying drawings, the same components are given the same reference numerals and are not repeatedly described. However, in describing the present disclosure, detailed descriptions of well-known technologies will be omitted so as not to obscure the description of the present disclosure with unnecessary detail.

FIG. 1 is a schematic diagram showing the configuration of a start-up apparatus for a cam angle sensor error of a mild hybrid system according to an embodiment of the present disclosure. The configuration of the start-up apparatus for a cam angle sensor error is described first with reference to FIG. 1.

Referring to FIG. 1, a start-up apparatus for a cam angle sensor error of a mild hybrid system according to an embodiment of the present disclosure includes a Mild Hybrid Starter and Generator (MHSG) 10 and a 12V starter motor 70. The MHSG 10 is connected to an engine crankshaft 22 through a belt (or a chain) to start an engine 20 using power from a high-voltage battery 30 or generate power using output of the engine 20, and the 12V starter motor 70 starts the engine 20 using power from a low-voltage battery 60.

A low-voltage battery may operate at a voltage for example about or less than 100, 90, 80, 70, 60, 50, 40, 30 or 20 volts such as 12V. In a specific embodiment, a low-voltage battery 26 and may operate at a voltage of 12 volts.

A high-voltage battery as referred to herein may operate at a voltage in 50 volts or more, such as 100, 150, 200, 250 or 300 volts or more. In one embodiment, a high-voltage battery may operate at a high voltage of 300.

A low-voltage battery may be for example a lead-acid battery. A high-voltage battery may be for example a lithium-ion device or other suitable device without limitation that employs electrochemical processes to store electrical energy for consumption by operation of the vehicle, and may have a voltage level near 300V DC in certain embodiments.

The start-up apparatus for a cam angle sensor error of a mild hybrid system according to an embodiment of the present disclosure includes a cam angle sensor 25 and a crank angle sensor 23. The cam angle sensor 25 is disposed on each of intake-side and exhaust-side cam shafts 24, detects a rotational position or a rotational angle of the cam shafts 24, and the crank angle sensor 23 detects a rotational position or a rotational angle of a crankshaft 22.

The detection information by the cam angle sensor 25 and the crank angle sensor 23 is provided to a controller 40 and the controller 40 determines an optimal fuel injection time and an ignition time for each cylinder by analyzing the provided detection information (the information about the rotational positions or rotational angles of the cam shafts 24 and the crankshaft 22). Further, the controller controls a fuel injection and an ignition plug so that fuel is injected and ignited at the determined fuel injection time and ignition time.

The controller 40 determines a fuel injection time and ignition time suitable for cranking on the basis of signals from the cam angle sensor 25 and the crank angle sensor 23 when the engine is started. The fuel injection and ignition plug are controlled so that fuel can be injected and ignited at the determined fuel injection time and ignition time, whereby a state in which the engine 20 can be driven by itself is made.

If an error is generated in the cam angle sensor 25, a fuel injection time cannot be accurately corrected, so engine stall may occur. Further, when a fuel injection time is not correct in starting-up, the engine state cannot change into a run state (in which an engine is driven by itself over idle rpm), so start-up may fail. A backup crank logic is programmed in the controller 40 to prepare for this situation.

A backup crank logic, as described above in the background, is a logic programmed to perform test injection using a signal from the crank angle sensor 23. In more detail, the backup crank logic is programmed to perform test injection with reference to a signal from the crank angle sensor 23 when the cam angle sensor 25 generates an error, and to determine that a fuel injection time has been fitted and to perform normal injection when the rpm increases during the test injection.

However, it is required to maintain the engine rpm at 200~250 rpm, which is the driving rpm of the 12V starter motor 70, in starting-up in order to normally operate the logic. That is, it is required to perform test injection (injecting fuel while changing a fuel injection time in small increments) while maintaining the engine rpm around 200~250 rpm that is the driving rpm of the 12V starter motor 70, and correct a fuel injection time while checking an rpm change during the test injection.

However, in a common mild hybrid system, a Mild Hybrid Starter and Generator (MHSG) drives an engine maximally up to 1200 rpm greatly exceeding the available rpm range (200~250 rpm) of the existing 12V starter motor 70. Accordingly, there is a problem that it is impossible to normally use such an existing backup crank logic when an error is generated in the cam angle sensor 25.

In order to solve this problem, the start-up apparatus for a cam angle sensor error of a mild hybrid system according to an embodiment of the present disclosure is configured to forcibly decrease the rpm of the MSHG close to an rpm at which the existing backup crank logic (a logic that finds out a fuel injection time by performing test injection around 200~250 rpm) when not being able to accurately correct a fuel injection time for start-up using the MHSG 10).

To this end, the controller 40 applied to the present disclosure can have one or more processors that are operated by a program constructed to be able to perform the series of processes to be described below step by step in order to be able to check whether the cam angle sensor 25 has an error in start-up using the MHSG 10 and to normally use the existing backup crank logic by forcibly decreasing the rpm of the MSHG when an error is generated.

The controller 40 may include a processor (a first processor) including a logic that determines whether the engine rpm at the end of cranking exceeds a reference rpm in start-up using the MHSG 10. Further, the controller 40 includes a processor (a second processor) that determines whether the engine rpm immediately after start-up follows a preset idle target rpm when the engine rpm at the end of cranking exceeds the reference rpm.

The reference rpm that is the reference when the first processor determines the engine rpm at the end of cranking may be a minimum engine rpm at the normal end of cranking when a remaining battery capacity is sufficient and start-up is performed through the MHSG 10. Considering that the MHSG 10 exceeds at least 800 rpm at the end of cranking under the assumption that the remaining battery capacity is sufficient, the reference rpm may be set as 800 rpm, but is not limited thereto.

The controller 40 further includes a processor (a third processor) that checks whether there is an error in the cam angle sensor 25 when poor following in which the engine rpm cannot follow the idle target rpm immediately after start-up, and a processor (a fourth processor) that forcibly changes the engine state into cranking when an error is found in the cam angle sensor 25 as the result of checking whether there is an error in the cam angle sensor 25.

The third processor can check whether there is an error in the cam angle sensor 25 from whether a Fail signal is output from a test signal applied to the cam angle sensor 25, and the fourth processor logically forcibly changes the engine state into cranking because a different RUN end rpm cannot be set for each EMS after the state of the engine 20 once changes into RUN.

When the engine rpm is forcibly changed into cranking by the fourth processor, the target rpm of the MHSG 10 is decreased to an available rpm range of the 12V starter motor 70 by another processor (a fifth processor) included in the controller 40, and then work of executing an existing backup crank logic that finds outs a fuel injection time while performing test injection using a signal from the crank angle sensor 23 is performed.

The work of decreasing the target rpm of the MHSG 10 to the available rpm range of the existing 12V starter motor 70 can be achieved by duty control of the MHSG 10. That is, the target rpm of the MHSG 10 is decreased to the available rpm range (200~250 rpm) of the existing 12V starter motor 70 by decreasing the output of the MHSG 10 through duty control of the MHSG 10, and the controller 40 finally determines whether the engine state has entered RUN through this series of processing.

Meanwhile, when the engine rpm at the end of cranking does not reach the reference rpm, the controller 40 determines whether start-up has failed. When failure of start-up is determined as the result, start-up is retried through the 12V starter motor 70. Further, when it is finally determined that the engine state has normally entered the RUN state as the result of determining whether the engine state has entered the RUN, the process is ended, or if not so, the process is changed to a process of determining whether start-up has failed.

Hereafter, an engine start process that is performed by the above-mentioned start-up apparatus for a cam angle sensor error of a mild hybrid system according to an embodiment of the present disclosure is described in more detail with reference to the flowchart of FIG. 2. For the convenience of description, the components shown in FIG. 1 are described with reference to their reference numerals.

Figure 2:
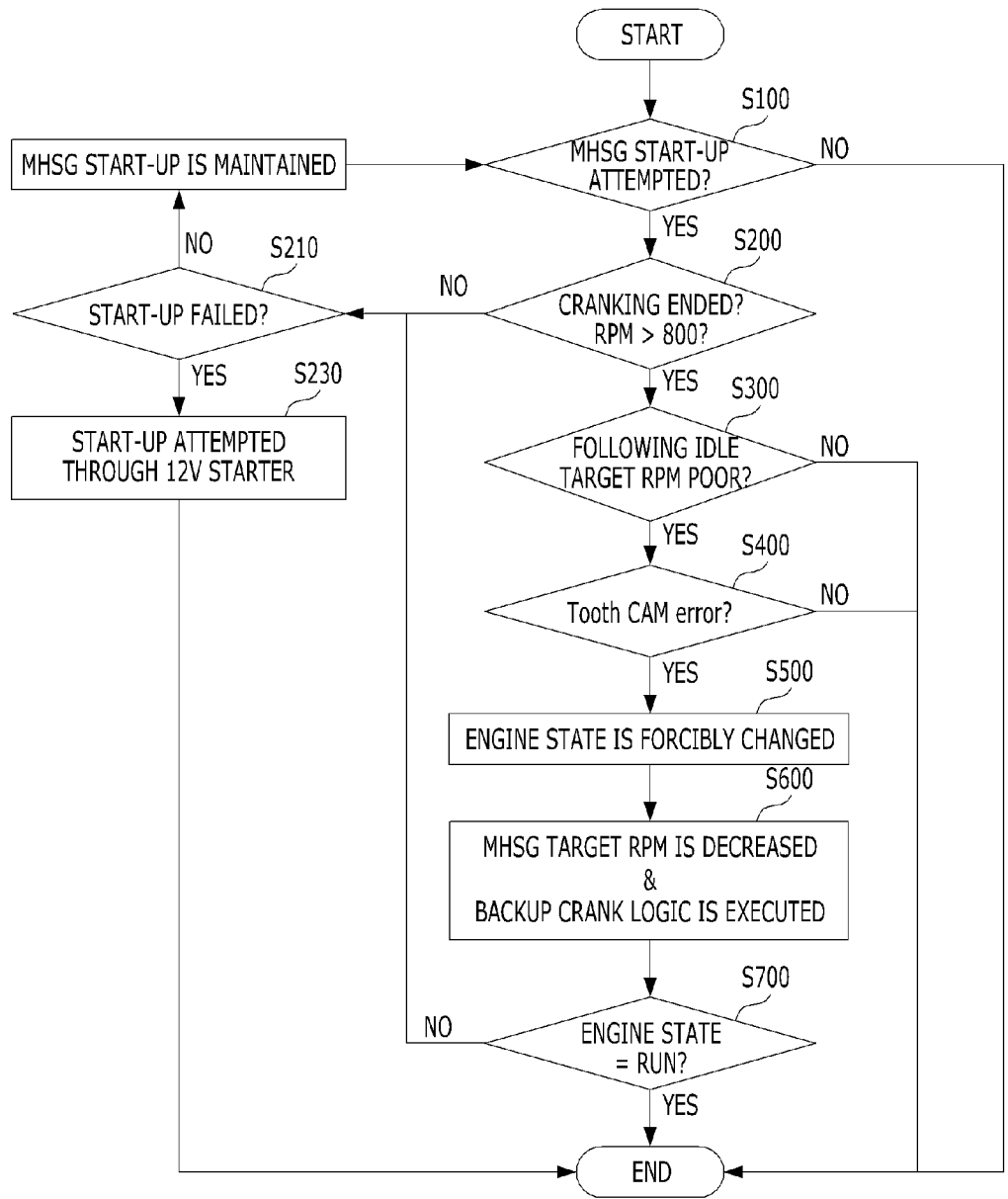
FIG. 2 is a flowchart illustrating of a start-up method for a cam angle sensor error of a mild hybrid system according to an embodiment of the present disclosure.

FIG. 2 is a flowchart illustrating of a start-up method for a cam angle sensor error of a mild hybrid system according to an embodiment of the present disclosure.

Referring to FIG. 2, a start-up method for a cam angle sensor error of a mild hybrid system according to an embodiment of the present disclosure is a method being able to normally use an existing backup crank logic when an error is generated in a camp angle sensor in start-up using a Mild Hybrid Starter and Generator (MHSG) of a mild hybrid system. The start-up method starts with a step of determining whether start-up is attempted through an MHSG in accordance with a request for start-up from a driver (S100).

When it is determined that there is an attempt at start-up using the MHSG as the result of determination in step S100, a step of comparing an engine rpm at the end of cranking for start-up with a preset reference rpm (S200) is performed. The reference rpm may be a minimum engine rpm (about 800 rpm) at the normal end of cranking when the remaining battery capacity is sufficient and start-up is performed using the MHSG.

When the engine rpm at the end of cranking exceeds the reference rpm as the result of comparison in step S200, the method enters a step of determining whether the engine rpm immediately after start-up follows a preset idle target rpm (S300). Further, when poor following in which the engine rpm immediately after start-up does not follow the idle target rpm is generated, whether there is an error in a cam angle sensor is checked (S400).

If the engine rpm immediately after start-up follows the preset idle target rpm in step S300, it means that start-up has been achieved without a special problem, so the process is no longer progressed and ended at the step. Further, the process is no longer progressed and ended at the state when it is also found that the cam angle sensor is normally operated.

Unlikely, when poor following in which the engine rpm immediately after start-up does not follow the idle target rpm is generated and an error is also found in the cam angle sensor, the engine state is forcibly changed into cranking (S500), and a step of decreasing the target rpm of an MHSG and of executing an existing backup crank logic that finds out a fuel injection time while performing test injection using a signal from a crank angle sensor is performed.

The work of decreasing the target rpm of the MHSG to the available rpm range of the existing 12V starter motor in step S600 can be achieved by duty control of the MHSG. That is, it is possible to decrease the target rpm of the MHSG to the available rpm range (200~250 rpm) of a 12V starter motor, in which an existing backup crank logic can be normally used, by decreasing the output of the MHSG through duty control of the MHSG.

Since the existing backup crank logic is executed in step S600, when the fuel injection time is accurately corrected, the engine rpm increases and the engine state changes into the RUN state. However, in the opposite case, the engine rpm does not increase. Accordingly, whether the engine state has entered the normal RUN state is determined by monitoring how the engine rpm is changed by execution of the existing backup crank logic.

In step S700, when the engine rpm increases over the idle target rpm by execution of the existing backup crank logic, it means that the fuel injection time is accurately corrected and the normal RUN state has been entered, so the process is ended. For example, when the idle target rpm is 800 rpm and the engine rpm becomes 800 rpm or higher by execution of an existing backup crank logic, it is determined that the fuel injection time has been appropriately corrected through test injection.

Meanwhile, when the engine rpm at the end of cranking does not reach the reference rpm as the result of comparison in step S200 described above, the process enters a step of determining whether start-up has failed (S210). When failure of start-up is determined in step S210, it is recognized that start-up is impossible through the MHSG, so start-up using the 12V starter motor is attempted again (S230), and when it is determined that start-up has not failed, the process returns to step S100.

Even though the engine state has not entered the normal RUN state (the engine rpm has not reached the idle target rpm even through test injection) in step S700, an algorithm may be constructed to change the process to step S210.

When an error is generated in a cam angle sensor, a fuel injection time cannot be accurately corrected, so engine stall may occur. Further, when a fuel injection time is not correct in starting-up, the engine state cannot change into a run state (in which an engine is driven by itself over idle rpm), so start-up may fail. A backup crank logic is programmed in a controller to prepare for this situation.

However, it is required to maintain the engine rpm at 200~250 rpm, which is the driving rpm of a 12V starter motor, in starting-up in order to normally operate a backup crank logic. That is, it is required to perform test injection (injecting fuel while changing a fuel injection time in small increments) while maintaining the engine rpm around 200~250 rpm that is the driving rpm of a 12V starter motor, and correct a fuel injection time while checking an rpm change during the test injection.

However, since, in a common mild hybrid system, a Mild Hybrid Starter and Generator (MHSG) drives an engine maximally up to 1200 rpm greatly exceeding the available rpm range (200~250 rpm) of an existing 12V starter motor, such an existing backup crank logic cannot be normally used when an error is generated in a cam angle sensor.

However, according to an embodiment of the present disclosure, it is possible to normally use an existing backup crank logic (a logic that finds out a fuel injection time by performing test injection around 200~250 rpm) even through an error is generated in a cam angle sensor when start-up is performed by an MHSG having large torque, whereby it is possible to clearly remove the problem of the related art that start-up is not achieved through an MHSG when an error is generated in a cam angle sensor.

Only a specific embodiment was described in the above detailed description. The present disclosure should not be construed as being limited to the specific embodiment described above, but should be construed as including all changes, equivalents, and substitutions within the spirit of the present disclosure defined in the claims.

What is claimed is:

1. A start-up method for a mild hybrid system, comprising:
   (a) determining that a start-up is attempted through a Mild Hybrid Starter and Generator (MHSG) of the mild hybrid system in accordance with a request for the start-up from a driver;
   (b) comparing an engine rpm at an end of cranking for the start-up with a preset reference rpm using the MHSG; determining that the engine rpm at the end of cranking exceeds the preset reference rpm in the comparison of (b);
   (c) determining that an engine rpm immediately after the start-up follows an idle target rpm;
   (d) determining poor following, in which the engine rpm immediately after the start-up does not follow the target rpm, is generated, and determining there is an error in a cam angle sensor when the poor following, is generated;
   (e) changing an engine state into a cranking state when the error is found in the cam angle sensor;
   (f) executing an existing backup crank logic that decreases a target rpm of the MHSG and finds out a fuel injection time while performing a test injection using a signal from a crank angle sensor when the engine state is changed into the cranking state; and
   (g) determining whether the engine state has entered a normal run state.

2. The start-up method of claim 1, wherein the preset reference rpm is a minimum engine rpm at the end of cranking when a remaining battery capacity is sufficient and the start-up is performed through the MHSG.

3. The start-up method of claim 1, wherein, in (f), the target rpm of the MHSG is decreased to an available rpm range of a starter motor by decreasing output through duty control of the MHSG.

4. The start-up method of claim 1, further comprising determining that the engine rpm at the end of cranking does not exceed the preset reference rpm in the comparison of (b) and (h) determining whether the start-up of the MHSG is impossible, representing that the start-up has failed, or the start-up of the MHSG is maintained, representing that the start-up has not failed.

5. The start-up method of claim 4, wherein the start-up is attempted again through a starter motor when it is determined that the start-up has failed in (h).

6. The start-up method of claim 4, further comprising performing the method again starting at (a) after it is determined that the start-up has not failed in (h).

7. The start-up method of claim 4, further comprising:
   ending the method after it is determined that the normal run state has been entered in (g); and
   performing the step (h) after it is determined that the normal run state has not been entered in (g).

8. The start-up method of claim 1, wherein when the engine rpm immediately after the start-up is the idle target rpm or higher, it is determined that the normal run state has been entered in (g).

9. An apparatus for addressing a cam angle sensor error of a mild hybrid system, the apparatus comprising:
   a Mild Hybrid Starter and Generator (MHSG) configured to perform a start-up using power from a high-voltage battery or charge the high-voltage battery by generating power using output of an engine;
   a starter motor configured to start the engine;
   a cam angle sensor configured to detect a rotational position or a rotational angle of a camshaft;
   a crank angle sensor configured to detect a rotational position or a rotational angle of a crankshaft; and
   a controller configured to control start of the engine on the basis of output from the cam angle sensor and the crank angle sensor;
   wherein the controller determines whether an engine rpm immediately after the start-up follows an idle target rpm when an engine rpm at an end of cranking for the start-up exceeds a preset reference rpm using the MHSG, checks whether there is an error in the cam angle sensor when poor following, in which the engine rpm immediately after the start-up does not follow the idle target rpm, is generated, forcibly changes an engine state into a cranking state when the error is found in the cam angle sensor, and executes an existing backup crank logic that decreases a target rpm of the MHSG and finds out a fuel injection time while performing a test injection using a signal from the crank angle sensor.

10. The apparatus of claim 9, wherein the preset reference rpm is an engine rpm at the end of cranking when a remaining battery capacity is sufficient and the start-up is performed through the MHSG.

11. The apparatus of claim 9, wherein when the target rpm of the MHSG is decreased, the target rpm of the MHSG is decreased to an available rpm range of the starter motor by decreasing output through duty control of the MHSG.

12. The apparatus of claim 9, wherein the controller determines that the start-up has failed when the engine rpm at the end of cranking does not reach the preset reference rpm, and reattempts the start-up through the starter motor when the start-up has failed.

\* \* \* \* \*